United States Patent Office.

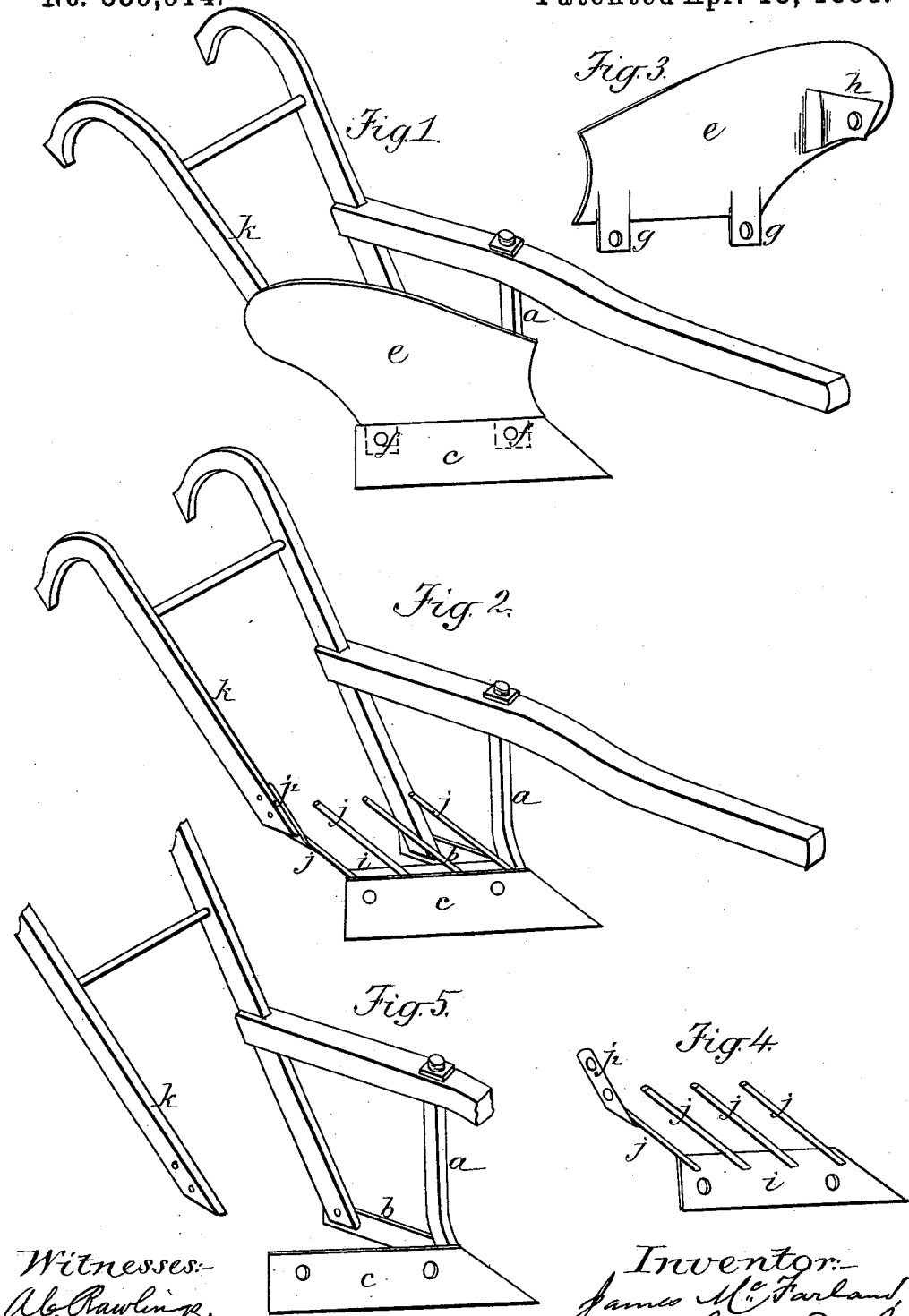

JAMES McFARLAND, OF MOLINE, ILLINOIS, ASSIGNOR OF ONE-HALF TO OSCAR PEAL, OF SAME PLACE.

PLOW POTATO-DIGGER.

SPECIFICATION forming part of Letters Patent No. 339,914, dated April 13, 1886.

Application filed February 4, 1886. Serial No. 190,791. (No model.)

*To all whom it may concern:*

Be it known that I, JAMES McFARLAND, a citizen of the United States, residing at Moline, in the county of Rock Island and State of Illinois, have invented new and useful Improvements in Plow Potato-Diggers, of which the following is a specification.

My invention relates to potato-diggers as an attachment to a plow; and my improvement is directed to provision whereby the implement may be used as a plow or as a potato-digger, the plow mold-board and the potato-digging attachments being interchangeable, to convert a plow, as such, into a potato-digger, as such, by removing the mold-board and replacing it by a potato-separating fingered attachment, so that the farmer has two separate agricultural implements interchangeably forming one.

Referring to the accompanying drawings, Figure 1 represents a plow; Fig. 2, the plow as a potato-digging attachment; Figs. 3 and 4, the interchangeable attachments for plowing or for digging potatoes; and Fig. 5 shows the plow-frame for the attachments shown in Figs. 3 and 4.

The plow has the usual plow-beam and handles, to which are secured the standard $a$, the landside $b$, and a share or shovel, $c$, secured to the point of the landside and to standard in an oblique position, like the removable share of the mold-board of a plow. These parts may be made and secured together in any suitable manner. The share or shovel part $c$ forms the base, to which the mold-board $e$ is secured by screw-bolts $f$, and which is made to form a joint with the upper edge of the share, and is bolted to its under side by ears or lugs $g$, extending from the lower edge of the mold-board, while a lug, $h$, on the rear side of the latter, serves to secure the outer end of the mold-board to the right handle. The mold-board, the share, and the handles may be otherwise braced together to render them strong and durable. The mold-board is of the usual plow form, and when secured to the share $c$ forms a continuation of its surface. This share forms the shovel or digger of a skeleton plow-frame to run beneath the potato-hills, and it is to this share that I attach the fingered device, so as to spread the soil and expose the potatoes as the shovel passes through and loosens up the hill or row.

In potato-digging it is important that the draft should be light and the depth of the run only sufficient to turn up the hills of earth containing the potatoes; hence I use a comparatively narrow share or shovel, so as to run with the action of a scraper.

The fingered attachment consists of a plate, $i$, formed for attachment to the under or inner side of the shovel by bolts $f$, and it may extend beyond the upper edge of the shovel or terminate on a level with it. Fingers $j$ stand up from this plate, inclining rearwardly about in line with the upturning face of the shovel, and they fill the space between the standards $a$ and the right plow-handle, $k$, in the same oblique range as the shovel. The fingered plate at its rear or outer end is fastened to the right plow-handle either by one of the fingers, as shown, or by an upward extension of the finger-plate from the end of the shovel. The length of the shovel is sufficient to give a wide fingered space, so that the upturned earth and potatoes will pass up over the inclined skeleton separator and be spread out on the ground, so that the potatoes can be easily gathered. The fingers are rigid and may be of any suitable form and arrangement that will break and loosen the upturned earth as it passes up over them from the shovel. It is important, however, that this breaking and loosening action take place as the earth is being raised, so that it will readily pass up over the fingers in a comparatively open thin sheet.

The implement may be made left-handed. As the fingers incline upward between the handles in parallel relation and are comparatively short, they cannot operate to turn the earth over to one side, but must deliver the soil in broken condition between the handles and at the outer end of the share $c$, so as to loosen and spread out the potato-hills. For this purpose the fingers stand up from the share in lines parallel with the draft of the plow, and only the outer one is attached to the left handle, so that behind and below the fingers between the handles there are no connections to obstruct the free spreading out of the potato-hills.

I claim—

1. The finger attachment for a plow, consisting of the plate $i$, having the fixed parallel fingers $j$, the outer one whereof terminates in the plate-arms $j^2$, as shown, for the purpose stated.

2. The digging attachment consisting of the plate $i$, the fixed parallel fingers $j$, one of which has the arm $j^2$, combined with the plow-handles, and the plow-frame consisting of the standard $a$, landside $b$, share $c$, and the bolts $f$, the said fingers having their free ends standing between the handles to deliver and spread the potato-hills between them, as shown and described.

In testimony whereof I have hereunto set my hand in the presence of two subscribing witnesses.

JAMES McFARLAND.

Witnesses:
   J. B. OAKLEAF,
   CHAS. J. PEAL.